United States Patent [19]
Ahn

[11] Patent Number: 6,019,363
[45] Date of Patent: Feb. 1, 2000

[54] DOCUMENT FEEDING DEVICE OF A FACSIMILE SYSTEM

[75] Inventor: Byung-Sun Ahn, Suwon, Rep. of Korea

[73] Assignee: SamSung Electronics Co., Ltd., Suwon, Rep. of Korea

[21] Appl. No.: 08/881,567

[22] Filed: Jun. 24, 1997

[30] Foreign Application Priority Data

Jun. 24, 1996 [KR] Rep. of Korea ...................... 96 23332

[51] Int. Cl.⁷ ..................................................... B65H 5/06
[52] U.S. Cl. .................................. 271/10.05; 271/10.13; 271/270
[58] Field of Search ............................ 271/10.05, 10.11, 271/10.12, 10.13, 270; 358/498

[56] References Cited

U.S. PATENT DOCUMENTS

| | | |
|---|---|---|
| 4,866,531 | 9/1989 | Kobori et al. . |
| 5,155,603 | 10/1992 | Seok-Jae .................................. 358/498 |
| 5,206,737 | 4/1993 | Sugiyama et al. . |
| 5,226,639 | 7/1993 | Kida et al. . |
| 5,369,509 | 11/1994 | Ko . |
| 5,391,009 | 2/1995 | Stodder . |
| 5,523,858 | 6/1996 | Yamada et al. . |
| 5,550,652 | 8/1996 | Park . |
| 5,552,902 | 9/1996 | Kohno . |
| 5,579,129 | 11/1996 | Iwata et al. ....................... 271/10.12 X |
| 5,749,570 | 5/1998 | Iwata et al. ....................... 271/10.05 X |
| 5,793,399 | 8/1998 | Kawakami et al. ............. 271/10.11 X |

FOREIGN PATENT DOCUMENTS 254445  11/1986  Japan ...................................... 271/270

Primary Examiner—William E. Terrell
Assistant Examiner—Patrick Mackey
Attorney, Agent, or Firm—Robert E. Bushnell, Esq.

[57] ABSTRACT

A document feeding device for transmitting the data of a document includes a feed roller for feeding successive sheets of document, a document sensor for sensing if the document sheet is loaded, a reading device for reading the data of the document and for converting the data into a digital signal, a feeding roller for feeding the document sheet to the reading device, and a register sensor located before the reading device, in which the document sheet is and by a power transmission gear, by driving a driving motor clockwise or counterclockwise at a constant revolution rate, optimum condition in any transmission modes can be maintained.

11 Claims, 7 Drawing Sheets

DOCUMENT FEEDING DEVICE OF A FACSIMILE SYSTEM

CLAIM OF PRIORITY

This application makes reference to, incorporates the same herein, and claims all benefits accruing under 35 U.S.C. §119 from an application for DOCUMENT FEEDING APPARATUS earlier filed in the Korean Industrial Property Office on the day of Jun. $24^{th}$, 1996 and there duly assigned Ser. No. 23332/1996, a copy of which application is annexed hereto.

BACKGROUND OF THE INVENTION

1. Field of the Invention

The present invention relates to a document feeding device of a facsimile system, and more particularly, relates to an automatic document feeding device of a facsimile system which prevents noise and resonance frequency due to mechanical abrasion and vibration when document is conveyed in such a facsimile system in order to optimize its mechanical condition and minimize image resolution deterioration and jitter.

2. Related Art

Conventional facsimile system operates in three modes: transmission, reception, and copying modes. In the transmission mode, an original document is read and the read image data is transmitted to a destination. In the reception mode, the image data sent from another communication system is recorded on a recording medium. In the copying mode, an original document is read and is recorded directly. Each facsimile system typically contains a signal transmission section and a signal reception section. The signal transmission section includes feed rollers for feeding a number of documents one by one to a predetermined station inside the system, transfer rollers for transferring the documents fed by the feed rollers, pressure rollers for closely contacting the surfaces of the documents with an image sensor for scanning the information recorded on the documents and a transmission motor for driving all rollers to permit reading and transmission of the original document. Contemporary document feeders for facsimile systems are disclosed, for example, in U.S. Pat. No. 4,866,531 for Recording Medium Feeding Apparatus issued to Kobori et al., U.S. Pat. No. 5,206,737 for Facsimile Apparatus Using A Single Bi-Directional Motor To Control Feeding Of an Original Document And A Recording Paper With Selection Between Plural Modes Of Operation issued to Sugiyama, U.S. Pat. No. 5,226,639 for Paper Feeding Device For Facsimile Apparatus issued to Kida et al., U.S. Pat. No. 5,369,509 for Document Transferring System For A Facsimile Apparatus issued to Ko, U.S. Pat. No. 5,391,009 for Single Motor Actuation For Automatic Stack Feeder System In A Hardcopy Device issued to Stodder, U.S. Pat. No. 5,523,858 for Facsimile Apparatus issued to Yamada et al., U.S. Pat. No. 5,550,652 for Automatic Document Feeder For A Facsimile Machine issued to Park, and U.S. Pat. No. 5,552,902 for Facsimile Apparatus With Internal Mechanism For Conveying Originals And Recording Paper issued to Kohno.

Generally, when each sheet of document is loaded to the automatic feeding device for data transmission, an image sensor which senses if document is loaded is operated, and feed rollers rotate, so that a friction pad which is located over the document, picks up the sheet of document for a predetermined distance, and then stops. In this point, the user dials a telephone number of a destination communication system, and pushes a start button to transmit the document according to the destination's reception condition. Otherwise, image data of the document is stored in a memory for an automatic transmission. Once the start button is pushed, the transmission motor is driven under control of a central processing unit (CPU) to drive automatic feed rollers of the facsimile system to convey the document picked up for document transmission to a destination communication system. Thereafter, each sheet of document passes through a discharge roller where the trailing edge of the document sheet is sensed by a sensor in order to temporarily disable operation of the step motor. If the document contains several pages, then each time the trailing edge of the document sheet is sensed by the sensor, a clutch of the automatic feeding roller is used to drive the automatic feeding roller to convey the next document sheet.

In advanced facsimile system including automatic document feeding device, the user can transmit a document through any one of three transmission modes, such as a normal transmission mode, a fine transmission mode and a super fine transmission mode. If highest image resolution is required, the super fine transmission mode must be selected. Fine transmission mode is selected for higher image resolution than normal transmission mode for image normal resolution. Generally, if higher image resolution is required, the reading device takes more time to accurately read image data of the document. Thus, when the document is conveyed on the reading device, the feeding speed of the document, via a step motor, must be controlled for the image data of the document to be read accurately. Thus, if the super fine transmission mode or fine transmission mode is set, the motor speed must be considerably lowered. In most facsimile systems available in the market, however, the optimal motor speed of a step motor is generally set at a revolution suitable only for the normal transmission condition. If the user desires to set the facsimile system in either a super fine transmission mode or a fine transmission mode for higher image resolution transmission in which the step motor must be driven at a revolution lower than that required for the normal transmission mode, the step motor fails to operate in its optimal condition. Consequently, mechanical abrasion between gears due to vibration or noise is inevitable. Moreover, gap between the gears is increased and the document which passes through the reading device is conveyed at an unsteady speed. These noted problems attributes to a system deterioration in image resolution of a received document and generation of jitters.

SUMMARY OF THE INVENTION

It is therefore an object of the present invention to provide an improved document feeding system of a facsimile system for optimal motor operation.

It is also an object to provide a document feeding device of a facsimile system in which an optimum condition of its motor is maintained in any one of transmission modes in order to prevent noise and resonance frequency due to vibration and mechanical abrasion, and to minimize image resolution deterioration and jitter.

It is another object to provide a document feeding device of a facsimile system in which a driving motor is rotated either in a clockwise or a counterclockwise direction at the same revolution in order to reduce mechanical abrasion and noise due to vibration.

These and other objects of the present invention can be achieved by an automatic document feeding device of a facsimile system which includes a document sensor senses if the document is loaded or not, and a feed roller and friction pad pick up the document sheet one by one. A register sensor arranges the document sheet on a feeding roller. A reading device reads the data of the information of the document, converts analog data into a digital signal, and transmits the digital signal to a counterpart through a modem. A delivery roller out off the document sheet, and a delivery sensor senses if the document sheet is discharged. A step motor alternately rotates in either a clockwise direction or a counterclockwise direction at the same revolution rate to optimally drive rollers in all transmission modes.

In accordance to one aspect of the present invention, a document feeding device of a facsimile system includes a step motor alternately rotatable in a clockwise direction and a counterclockwise direction at the same revolution rate. A first 2-stage reduction gear exhibiting a larger gear and a smaller gear is directly connected to the step motor to rotate in one of the clockwise direction and the counterclockwise direction. A swing gear to which a swing arm is connected, is rotatably engaged with the first 2-stage reduction gear to receive rotational power from the step motor. A series of second, third, and fourth 2-stage reduction gears each exhibiting integrally a larger gear and a smaller gear is used for feeding each sheet of document for transmission in either a fine transmission mode or a normal transmission mode. A pick-up gear is rotatably engaged with the smaller gear of the second 2-stage reduction gear and the larger gear of the third 2-stage reduction gear, for supporting a pick-up roller to pick up each sheet of document from a document feeder. A feed gear is rotatably engaged with the smaller gear of the third 2-stage reduction gear, for supporting upper and lower feed rollers to feed each sheet of document picked up from pick-up roller. A first idler gear is rotatably engaged with the larger gear of the third 2-stage reduction gear. A second idler gear is rotatably engaged with one side of the first idler gear and the smaller gear of the fourth 2-stage reduction gear. A third idler gear is rotatably engaged with the other side of the first idler gear and a delivery gear on which a delivery roller is set for discharging each sheet of document via a fourth idler gear. When the step motor rotates in the clockwise direction, the first 2-stage reduction gear rotates in the counterclockwise direction and moves the swing gear upward to be engaged with the second 2-stage reduction gear for feeding the document for transmission in a fine transmission mode. When the step motor rotates in the counterclockwise direction, the first 2-stage reduction gear rotates in the clockwise direction and moves the swing gear downward to be engaged with the fourth 2-stage reduction gear for feeding the document for transmission in a normal transmission mode.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Figure 1:
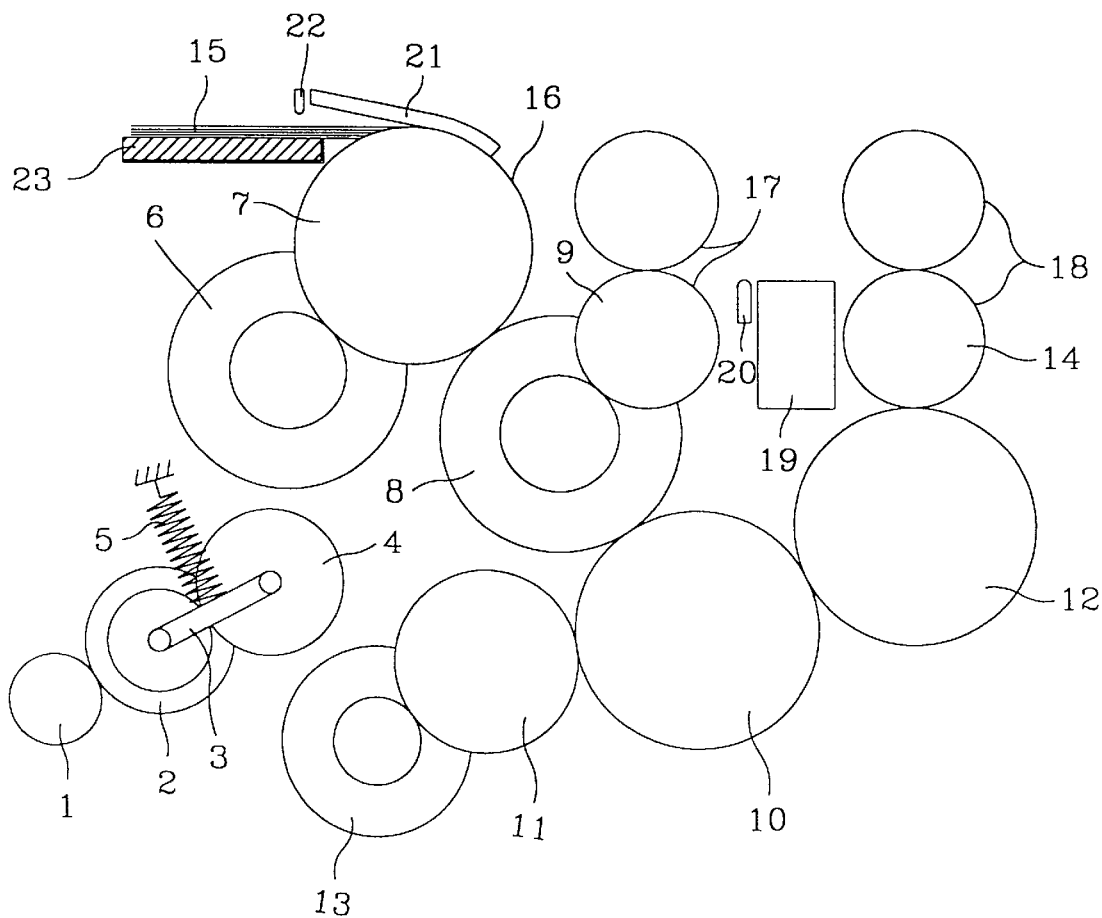
FIG. 1 illustrates a document feeding device of a facsimile system constructed according to a first embodiment of the present invention.

Referring now to the drawings and particularly to FIG. 1, which illustrates a document feeding apparatus of, for example, a facsimile system as constructed according to a first embodiment of the present invention. As shown in FIG. 1, the automatic document feeding apparatus includes a step motor 1, a first 2-stage reduction gear 2 including a swing arm 3 connected to a swing gear 4 under tension of a tension spring 5, a second 2-stage reduction gear 6, a pick-up gear 7, a third 2-stage reduction gear 8, a feed gear 9, a series of first, second and third idlers gears 10, 11, 12, a fourth 2-stage reduction gear 13, a delivery gear 14, a (first) feed roller 16 driven by pick-up gear 7 to pick up each sheet of document 15 from document feeder 23 guided by friction pad 21, a reading device 19 for reading image data from the sheet of document fed into the facsimile system, a register sensor 20 for sensing document registration, and a document sensor 22 for sensing whether each sheet of document is fed from document feeder 23.

A first 2-stage reduction gear 2 is engaged with a swing gear 4 to which a swing arm 3 is connected. Reduction gear 2 receives power from the gear of the step motor 1 which alternately rotates in either a clockwise or a counterclockwise direction. A tension spring 5 is set on swing aim 3. The second 2-stage reduction gear 6 is located on one side of swing gear 4. The smaller gear of second 2-stage reduction gear 6 is engaged with a pick-up gear 7 on which a feed roller 16 picking up each sheet of document 15 is set. Pick-up gear 7 is engaged with the third 2-stage reduction gear 8 at the bottom of the pick-up gear. The smaller gear of second reduction gear 8 is engaged with a feed gear 9. Upper and lower (second and third) feed rollers 17 are set on feed gear 9.

The larger gear of second reduction gear 8 is engaged with a first idler gear 10 which, in turn, is interacted with a second idler gear 11 and a third idler gear 13. Second idler gear 11 is engaged with a fourth 2-stage reduction gear 13. Swing gear 4 is selectively engaged with fourth 2-stage reduction gear 13. Third idler gear 12 is engaged with a delivery gear 14 on which a delivery roller 18 is set. A reading device 19 is set between feed roller 17 and delivery roller 18. A register sensor 20 is located on reading device 19. A friction pad 21 is located on feed roller 16, and a document sensor 22 is located over the feed roller. Document sheet 15 is loaded on a document feeder 23, and at the same time, located on feed roller 16. When the step motor 1 rotates in a clockwise direction, first 2-stage reduction gear 2 rotates in a counterclockwise direction and moves swing gear 4 upward to be engaged with first reduction gear 6. When the step motor 1 rotates in a counterclockwise direction, first 2-stage reduction gear 2 rotates in a clockwise direction and moves swing gear 4 installed at the swing arm 3 downward to be engaged with fourth 2-stage reduction gear 13.

Figure 2:
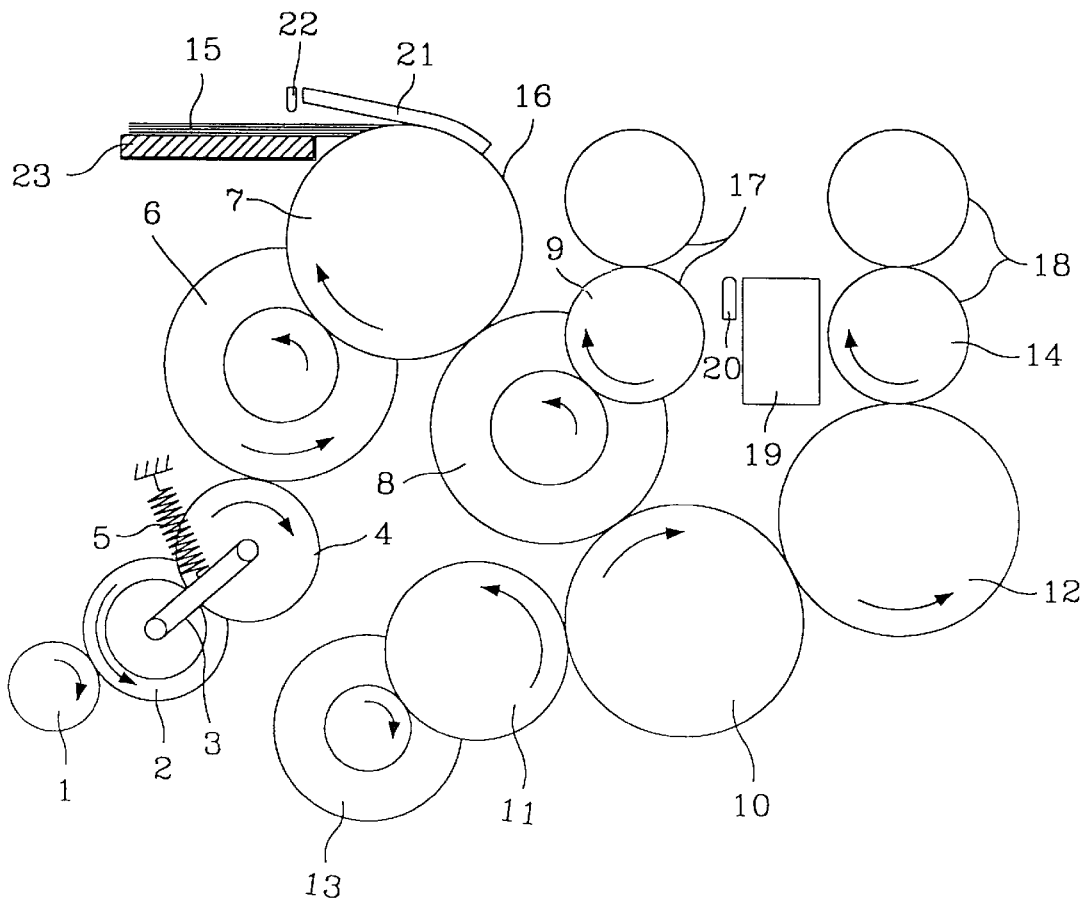
FIG. 2 illustrates a document feeding device operable in a normal mode according to the first embodiment of the present invention.
Figure 3:
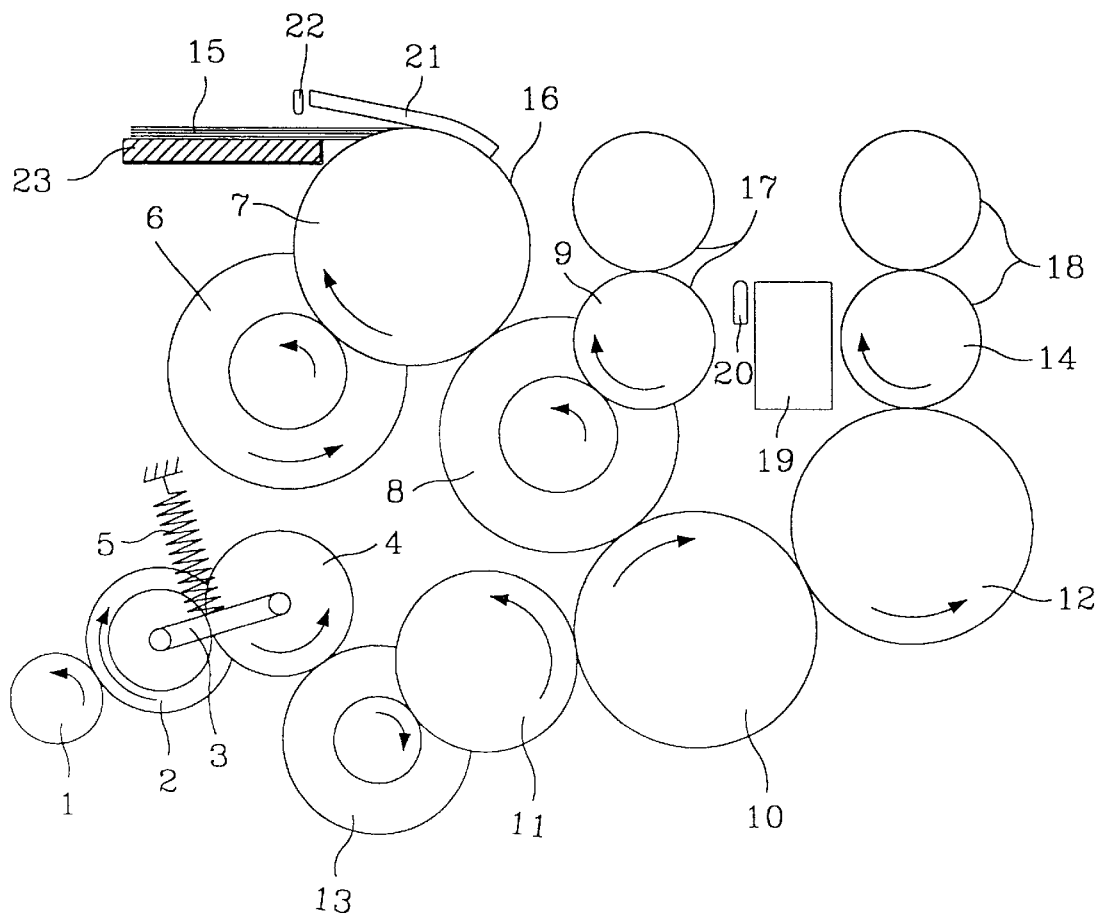
FIG. 3 illustrates a document feeding device operable in a fine mode according to the first embodiment of the present invention.

Refer now to FIGS. 2 and 3 which illustrate a document feeding device for operation in either a normal transmission mode or a fine transmission mode. The operation and effect of the document feeding device of a facsimile system constructed according to a first embodiment of the present invention will now be described with reference to FIGS. 1 to 3 hereinbelow.

When a document sheet 15 is loaded on document feeder 23, document sensor 22 which senses if document 15 is loaded is operated, and feed roller 16 picks up one sheet of the document by a predetermined distance through friction pad 21, simultaneously, a counterpart communication system is dialed, and a start button is pushed for a normal transmission mode. When the start button is pushed for the normal transmission mode, step motor 1 rotates in a clockwise direction as shown in FIG. 2. First 2-stage reduction gear 2 connected to the gear of step motor 1 is rotated in a counterclockwise direction, and swing gear 4 connected to reduction gear 2 through swing gear 4 is rotated in a clockwise direction, and moved upward, to be engaged with the larger gear of second 2-stage reduction gear 6. Since reduction gear 6 rotates in a counterclockwise direction, and pick-up gear 7 connected to the smaller gear of second 2-stage reduction gear 6 rotates in a clockwise direction, feed roller 16 rotates in a clockwise direction and carries document sheet 15 to feed roller 17.

As the pick-up gear 7 rotates in a clockwise direction, third 2-stage reduction gear 8 engaged with pick-up gear 7 rotates in a counterclockwise direction, and feed gear 9 rotates in a clockwise direction to drive upper and lower feed rollers 17. Here, document sheet 15 passes through feed roller 17, and the sheet is read by reading device 19. Then, the document sheet is conveyed to delivery roller 18. Simultaneously, first idler gear 10 engaged with third 2-stage reduction gear 8 rotates in a clockwise direction, and third idler gear 12 rotates in a counterclockwise direction, in order to rotate delivery gear 14 in a clockwise direction. By doing so, document sheet 15 is discharged from delivery roller 18. Here, fourth 2-stage reduction gear 13 idles through second idler gear 11 engaged with first idler gear 10.

When the facsimile system is normal operation, step motor 1 rotates in a clockwise direction. The leading edge of document sheet 15 passes through feed rollers 16 and 17, and then is placed on register sensor 20, register sensor 20 senses document 15, and stops the step motor 1 from rotation. In this state, when the transmission mode is converted into a fine transmission mode, step motor 1 rotates in a counterclockwise direction, reduction gear 2 engaged with the gear of step motor 1 rotates in a clockwise direction, swing gear 4 connected with swing arm 3 is rotated in a counterclockwise direction and moved downward, to be engaged with the larger gear of fourth 2-stage reduction gear 13. Here, reduction gear 13 rotates in a clockwise direction, second idler gear 11 engaged with the smaller gear of reduction gear 13 rotates in a counterclockwise direction to rotate first idler gear 10 engaged with second idler gear 11, and third idler gear 12 rotates in a counterclockwise direction to rotate delivery gear 14 in a clockwise direction. Here, third 2-stage reduction gear 8 connected to first idler gear 10 rotates in a counterclockwise direction to rotate feed gear 9 engaged with its smaller gear clockwise. Pick-up gear 7 engaged with third reduction gear 8 rotates in a clockwise direction, and second 2-stage reduction gear 6, which is engaged with the pick-up gear 7, idles counterclockwise, without transmitting rotational power.

If the step motor 1 rotates in a counterclockwise direction in a fine transmission mode, the driving power of the reduction gears is reduced so as to rotate feed roller 17. Thus, document sheet 15 is discharged through reading device 19 and delivery roller 18. As described above, since the step motor 1 rotates in either a clockwise direction or a counterclockwise direction at the same revolution, optimum condition of the step motor 1 is maintained at any transmission mode. Accordingly, it is possible to prevent noise and resonance frequency due to the mechanical abrasion and vibration, and to optimize operation of mechanical components while preventing image resolution deterioration and jitter.

Figure 4:
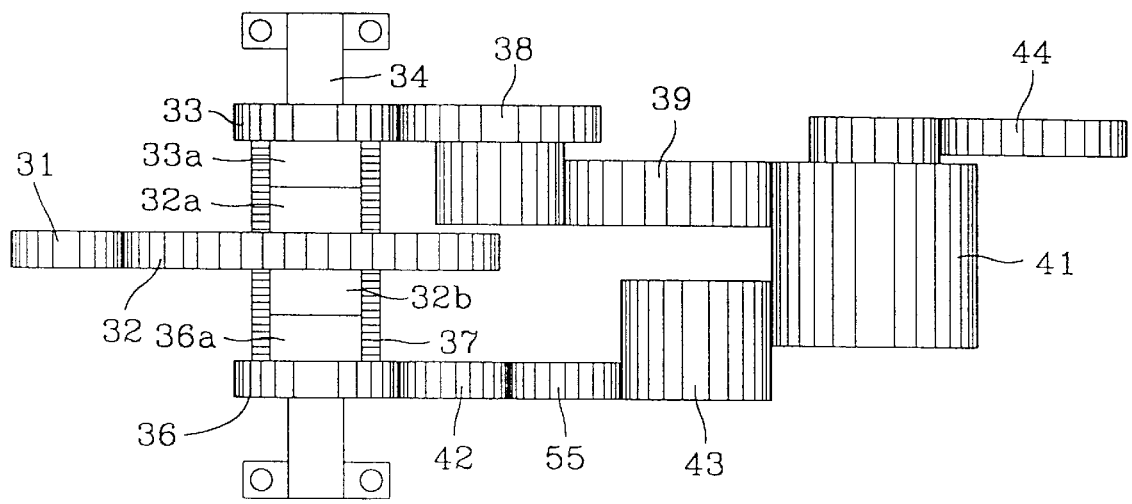
FIG. 4 illustrates a document feeding device of a facsimile system constructed according to a second embodiment of the present invention.

Turning now to FIG. 4 which illustrates an automatic document feeding device of a facsimile system as constructed according to a second embodiment of the present invention. The automatic document feeding device as shown in FIG. 4 includes a step motor 31, a power transmission gear 32 with adjacent hubs 32a and 32b connected to adjacent drive gears 33 and 36 via corresponding cylinders 33a and 36a. A 2-stage reduction gear 38 is rotatably engaged with drive gear 33 and first idler gear 39. A series of second, third, fourth and fifth idler gears 42, 43, 44 and 55 are rotatably engaged with drive gear 36 for driving feed gear 41.

Figure 5:
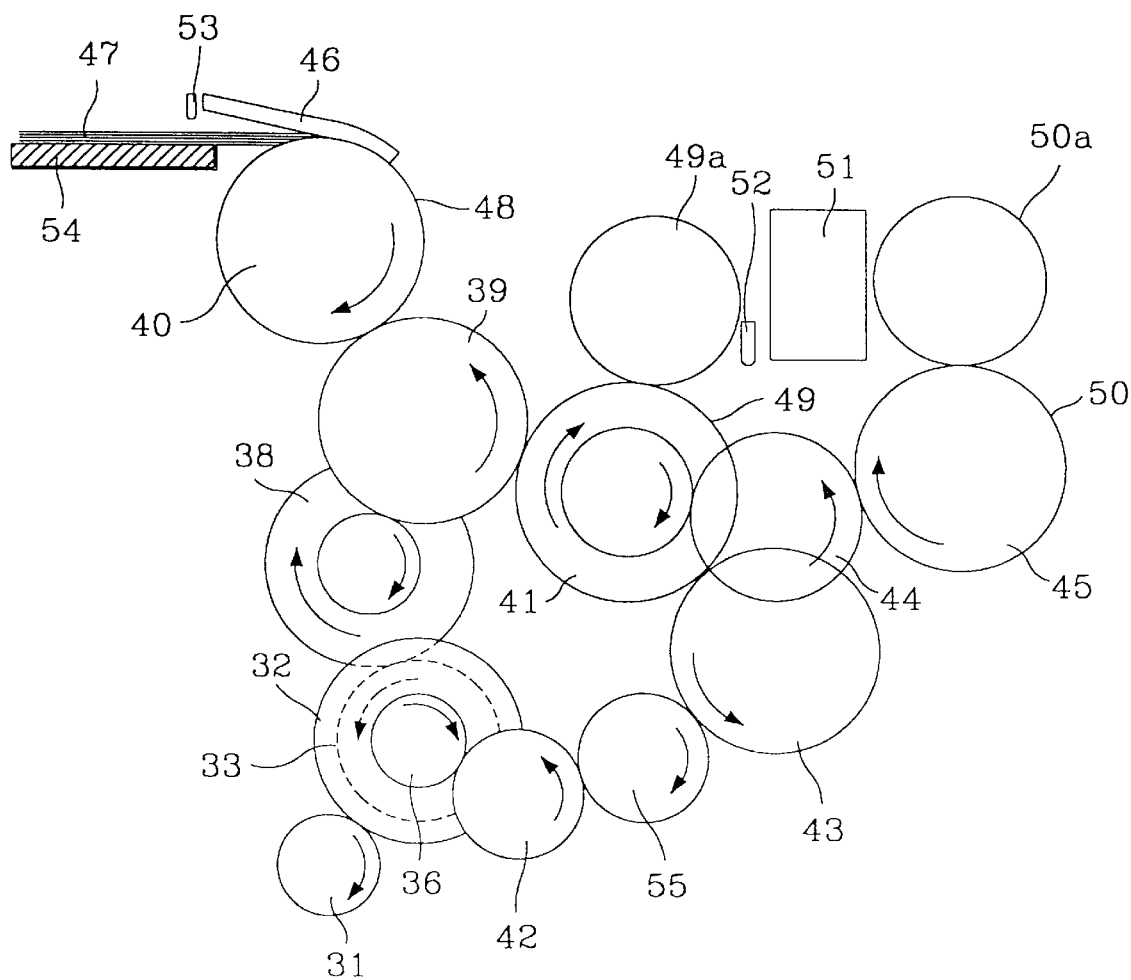
FIG. 5 illustrates a document feeding device operable in a normal mode according to the second embodiment of the present invention.
Figure 6:
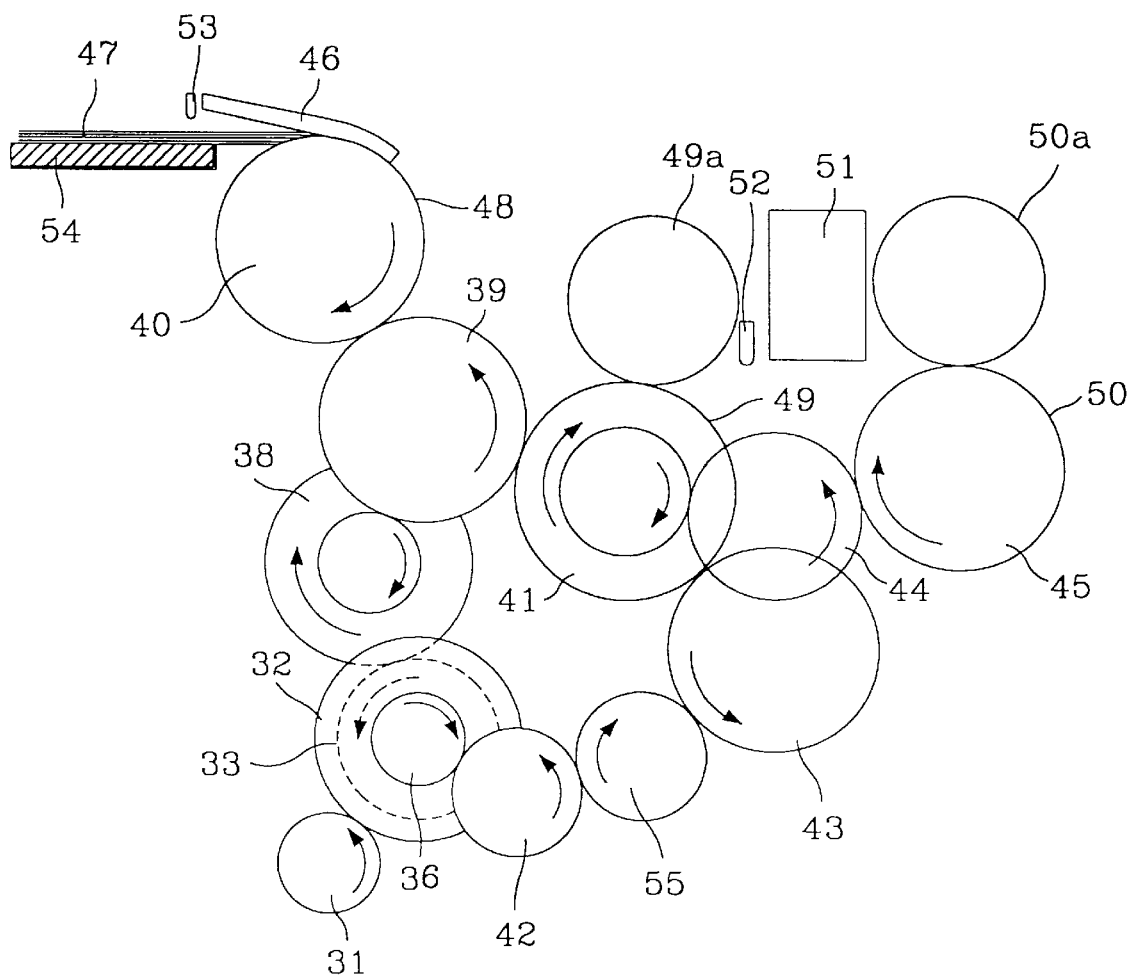
FIG. 6 illustrates a document feeding device operable in a fine mode according to the second embodiment of the present invention.
Figure 7A:
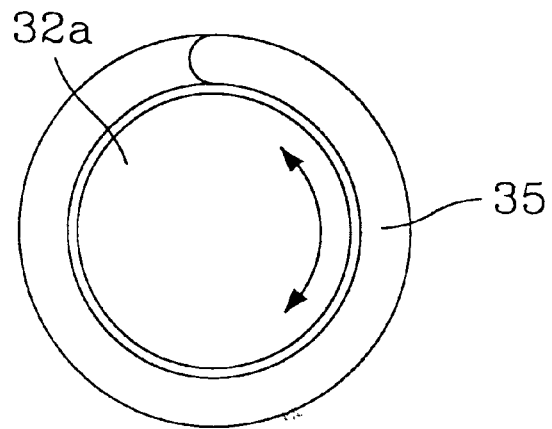
FIG. 7A illustrates a state when a spring clutch winds clockwise one hub of a power transmission gear of the automatic document feeding device as shown in FIG. 4.
Figure 7B:
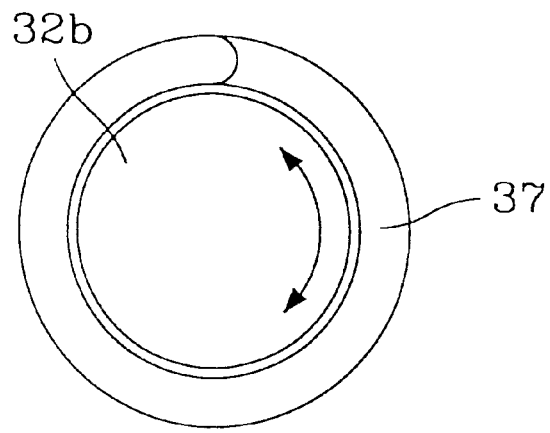
FIG. 7B illustrates a state when the spring clutch winds counterclockwise the other hub of a power transmission gear of the automatic document feeding device as shown in FIG. 4.

FIGS. 5 and 6 illustrate a document feeding device as shown in FIG. 4 for operation in either a normal transmission mode or a fine transmission mode, and FIGS. 7A and 7B illustrate a state when a spring clutch winds either clockwise one hub of a power transmission gear or counterclockwise the other hub of a power transmission gear according to the principles of the present invention. The operation and effect of the document feeding device of a facsimile system constructed according to the second embodiment of the present invention will now be described with reference to FIGS. 4 to 7A and 7B hereinbelow.

When the automatic document feeding device in which document is conveyed to transmit to the counterpart communication system, adjacent hubs 32a and 32b are set on both sides of a power transmission gear 32 which transmits power by the gear of a step motor 31 which rotates either in a clockwise direction or in a counterclockwise direction. First adjacent drive gear 33 used for normal transmission mode is set on shaft 34. A cylinder 33a is set on drive gear 33, and opposite to hub 32a. A spring clutch 35 is set between one hub 32a and gear 33 used for normal transmission mode. Spring clutch 35 is wound clockwise. Second adjacent gear 36 used for fine transmission mode is set on shaft 34. A cylinder 36a is set on gear 36, and opposite to the other hub 32b of power transmission gear 32. A spring clutch 37 is set between the other hub 32b, and gear 36 used for fine transmission mode. Spring clutch 37 is wound counterclockwise.

Drive gear 33 used for normal transmission mode is engaged with a 2-stage reduction gear 38. The smaller gear of reduction gear 38 is engaged with first idler gear 39. First idler gear 39 is engaged with a pick-up gear 40 at the upper portion of idler gear 39. Pick-up gear 40 has a feed roller 48 picking up a document sheet 47 thereon. First idler gear 39 is engaged with feed gear 41 at the lower portion of idler gear 49. Upper and lower feed rollers 49 are set on feed gear 41.

Drive gear 36 used for fine transmission mode is engaged with second idler gear 42, and one side of second idler gear 42 is engaged with a fifth idler gear 55. Fifth idler gear 55 is engaged with third idler gear 43. Third idler gear 43 is engaged with the larger gear of feed gear 41. Fourth idler gear 44 is engaged with the smaller gear of feed gear 41. Fourth idler gear 44 is engaged with a delivery gear 45 on which a delivery roller 50 is set. Feed roller 49 is engaged with upper feeding roller 49a, and delivery roller 50 is engaged with upper delivery roller 50a. A reading device 51 is set between upper feeding roller 49a and upper delivery roller 50a, and a register sensor 52 is set over reading device 51. A friction pad 46 and document sensor 53 are set on feed roller 40. Document sheet 47 is loaded on document feeder 54, and at the same time, located on feed roller 48

When the step motor 31 rotates in a clockwise direction, spring clutch 35, which is set on hub 32a of power transmission gear 32, directly transmits power to gear 33 used for normal mode. Spring clutch 37 cannot deliver power to gear 36 used for fine transmission mode because it is released. Thus, gear 36 idles. When step motor 31 rotates in a counterclockwise direction, however, power is delivered to gears 33 and 36 by the operation of spring clutches, opposite to the above-described operation.

The operation and effect of the document feeding device of the present invention will be explained in detail as follows. In the document feeding apparatus, when document sheet 47 is loaded on document feeder 54, document sensor 53 senses if document sheet 47 is loaded or not, so that feed roller 48 picks up one sheet of document 47 by a predetermined distance through friction pad 46, simultaneously, a counterpart communication system is dialed, and the start button is pushed for a normal transmission mode. When the start button is pushed for a normal transmission mode, as shown in FIG. 5, step motor 31 rotates in a clockwise direction for normal transmission mode operation. Power transmission gear 32 connected to the gear of step motor 31 is rotated in a counterclockwise direction, and spring clutch 35, which winds round hub 32a clockwise, is tightened in order to tighten cylinder 33a of gear 33 used for normal transmission mode. Thus, gear 33 is rotated in a counterclockwise direction, and reduction gear 38 engaged with gear 33 is rotated in a clockwise direction. Here, idler gear 39 engaged with the smaller gear of reduction gear 38 is rotated in a counterclockwise direction in order to rotate pick-up gear 40 located thereon. By doing so, feed roller 48 is rotated in a clockwise direction in order to convey document sheet 47 to feed roller 49.

Simultaneously, feed gear 41 engaged with one side of idler gear 39 is rotated in a clockwise direction in order to drive upper and lower feed rollers 49 and 49a. Here, document sheet 47 passes through feed roller 49, and the document sheet is read by reading device 51, and then conveyed to delivery roller 50. At the same time, fourth idler gear 44 engaged with the smaller gear of feed gear 41 is rotated in a counterclockwise direction, and delivery gear 45 engaged with gear 44 is rotated in a clockwise direction in order to discharge document sheet 47 via delivery roller 50. Here, fifth idler gear 55 is rotated clockwise due to third idler gear 43 engaged with the larger gear of feeding gear 41, second idler gear 42 is rotated in a counterclockwise direction, and gear 36 engaged with gear 42 idles clockwise. Since spring clutch 37, which is set on hub 32b of power transmission gear 32, and cylinder 36a of gear 36, is wound counterclockwise, spring clutch 37 is rotated to be released when gear 36 is rotated in a clockwise direction as described above. Thus, gear 36 idles.

When the facsimile system is driven for normal transmission, step motor 31 is rotated in a clockwise direction. The leading edge of document sheet 47 is placed on register sensor 52 through feed roller 48 and feeding roller 49, register sensor 52 senses document sheet 47, and stops step motor 31 from rotation. In this state, if the transmission mode is converted into a fine transmission mode, step motor 31 is rotated in a counterclockwise direction as shown in FIG. 6. Here, power transmission gear 32 connected to the gear of step motor 31 is rotated in a clockwise direction, and spring clutch 37, which winds round hub 32b in a counterclockwise direction, is tightened in order to tighten cylinder 36a of gear 36 used for the fine transmission mode. By doing so, gear 36 is rotated clockwise, and first idler gear 42 engaged with gear 36 is rotated in a counterclockwise direction. Fifth idler gear 55 engaged with second idler gear 42 is rotated in a clockwise direction, third idler gear 43 is rotated in a counterclockwise direction, and feed gear 41 located thereon is rotated in a clockwise direction in order to convey document sheet 47 from feed roller 49.

Here, document sheet 47 passes feed roller 49, the sheet is read by reading device 51, and then conveyed to delivery roller 50. Simultaneously, fourth idler gear 44 engaged with the smaller gear of feed gear 41 is rotated in a counterclockwise direction, and delivery gear 45 engaged with gear 44 is rotated in a clockwise direction in order to discharge document sheet 47 via delivery roller 50. Pick-up roller 40 and reduction gear 38 are rotated in a clockwise direction owing to idler gear 38 engaged with the larger gear of feeding gear 41, and gear 33 engaged with reduction gear 38 idles counterclockwise. That is, since one hub 32a of power transmission gear 32, and spring clutch 35 set on cylinder 33a of gear 33 are wound clockwise, the gear 33 is rotated to be released. Thus, gear 33 used for the normal transmission mode idles.

As described above, step motor is alternately rotated in either a clockwise or a counterclockwise direction at the same revolution rate. Since optimum condition of the motor is maintained in any transmission modes, it is possible to prevent noise and resonance frequency due to mechanical abrasion and vibration. Therefore, mechanical components of the facsimile system can be optimized, and resolution deterioration and jitter can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. For example, while the automatic document feeding device is intended for use in facsimile systems, other image forming apparatuses such as printers or compact copiers are also contemplated. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A document feeding device for a facsimile system, comprising:
   a step motor alternately rotatable in a first direction and a second direction opposite to said first direction;
   a first multiple stage reduction gear exhibiting a larger gear and a smaller gear directly connected to said step motor to rotate in one of said first direction and said second direction;

a swing gear to which a swing arm is connected, rotatably engaged with said reduction gear to receive power from said step motor for rotation in one of said first direction and said second direction;

a second multiple stage reduction gear exhibiting integrally a larger gear and a smaller gear;

a third multiple stage reduction gear exhibiting integrally a larger gear and a smaller gear;

a fourth multiple stage reduction gear exhibiting integrally a larger gear and a smaller gear;

a pick-up gear rotatably engaged with the smaller gear of said second multiple stage reduction gear and the larger gear of said third multiple stage reduction gear, for supporting a pick-up roller to pick up each sheet of document from a document feeder;

a feed gear rotatably engaged with the smaller gear of said third multiple stage reduction gear, for supporting upper and lower feed rollers to feed each sheet of document picked up from pick-up roller;

a first idler gear rotatably engaged with the larger gear of said third multiple stage reduction gear;

a second idler gear rotatably engaged with one side of said first idler gear and the smaller gear of said fourth multiple stage reduction gear;

a third idler gear rotatably engaged with the other side of said first idler gear and a delivery gear on which a delivery roller is set for discharging each sheet of document via a fourth idler gear; and a reading device located between the upper and lower feed rollers and delivery roller, for reading image data corresponding to each sheet of document.

2. The document feeding device of claim 1, wherein, when said step motor rotates in said first direction, said first multiple stage reduction gear rotates in said second direction and moves upward the swing gear to be engaged with said second multiple stage reduction gear for feeding the document for transmission in a fine transmission mode.

3. The document feeding device of claim 1, wherein, when said step motor rotates in said second direction opposite to said first direction, said first multiple stage reduction gear rotates in said first direction and moves downward the swing gear to be engaged with said fourth multiple stage reduction gear for feeding the document for transmission in a normal transmission mode.

4. The document feeding device of claim 1, wherein the swing gear selectively swings according to a revolution direction of said first multiple stage reduction gear connected to the step motor so as to be driven at a revolution of one of a normal transmission mode and a fine transmission mode.

5. The document feeding device of claim 1, further comprising a tension spring installed on the swing arm of the swing gear, so that the swing gear is separately located between said second multiple stage reduction gear and said fourth multiple stage reduction gear.

6. The document feeding device of claim 1, wherein said step motor alternately rotates in said first direction and said second direction opposite to said first direction at the same revolution rate.

7. A feeding device for a document, comprising:

a bidirectional step motor rotatable in either a first direction and a second direction opposite to said first direction;

a first multiple stage reduction gear exhibiting a larger gear and a smaller gear directly connected to said step motor to rotate in one of said first direction and said second direction;

a swing gear to which a swing arm is connected, rotatably engaged with said reduction gear to receive power from said step motor for rotation in one of said first direction and said second direction;

a second multiple stage reduction gear, a third multiple stage reduction gear, and a fourth multiple stage reduction gear;

a pick-up gear rotatably engaged with at least one of said plurality of multiple stage gears, for supporting a pick-up roller to pick up each sheet of document from a document feeder;

a feed gear rotatably engaged with one of said plurality of multiple stage gears, for supporting upper and lower feed rollers to feed each sheet of document picked up from pick-up roller;

a plurality of idler gears engaged to said plurality of multiple stage reduction gears and a delivery gear on which a delivery roller is set for discharging each sheet of document;

a reading device located between the upper and lower feed rollers and delivery roller, for reading image data corresponding to each sheet of document; and a tension spring installed on the swing arm of the swing gear, so that the swing gear is separately located between said second multiple state reduction gear and said fourth multiple stage reduction gear.

8. The feeding device of claim 7, wherein when said bidirectional step motor rotates in said first direction, said first multiple stage reduction gear rotates in said second direction and moves upward the swing gear to be engaged with one of said plurality of multiple stage reduction gears for feeding the document for transmission in a fine transmission mode.

9. The feeding device of claim 7, wherein, when said step motor rotates in said second direction opposite to said first direction, said first multiple stage reduction gear rotates in said first direction and moves downward the swing gear to be engaged with a second of said plurality of multiple stage reduction gears for feeding the document for transmission in a normal transmission mode.

10. The feeding device of claim 7, wherein the swing gear selectively swings according to a revolution direction of said first multiple stage reduction gear connected to the step motor so as to be driven at a revolution of one of a normal transmission mode and a fine transmission mode.

11. The feeding device of claim 7, wherein said step motor alternately rotates in said first direction and said second direction opposite to said first direction at the same revolution rate.

* * * * *